United States Patent [19]

Deaton

[11] 4,109,075

[45] Aug. 22, 1978

[54] SEPARATION OF SACCHARIDES BY EXCLUSION CHROMATOGRAPHY

[75] Inventor: Irving F. Deaton, LaGrange Park, Ill.

[73] Assignee: CPC International Inc., Englewood Cliffs, N.J.

[21] Appl. No.: 694,258

[22] Filed: Jun. 9, 1976

[51] Int. Cl.² .............................................. C07H 1/06
[52] U.S. Cl. ......................................... 536/1; 536/4; 536/102
[58] Field of Search ....................................... 536/1, 4

[56] References Cited

U.S. PATENT DOCUMENTS

| | | | |
|---|---|---|---|
| 2,524,414 | 10/1950 | Wolfrom et al. | 536/1 |
| 3,173,908 | 3/1965 | Mann et al. | 536/1 |
| 3,514,327 | 5/1970 | Parrish | 536/1 |
| 3,562,289 | 2/1971 | Battista et al. | 536/1 |
| 3,864,166 | 2/1975 | Barker et al. | 536/1 |
| 3,959,251 | 5/1976 | Porath et al. | 536/1 |
| 3,988,314 | 10/1976 | Argoudelis et al. | 536/1 |

*Primary Examiner*—Johnnie R. Brown

[57] ABSTRACT

A process for separating saccharides by exclusion chromatography wherein a feed mixture of saccharides is supplied to a molecular exclusion chromatography zone from which at least three fractions are removed. The first fraction contains the least diffusible saccharides of the mixture which generally are the highest molecular weight components, the second fraction contains predominantly intermediate molecular weight saccharides and the third fraction contains predominantly lower molecular weight saccharide fractions. After supplying the feed to the column, the zone is continuously eluted, first with the first fraction removed from the column followed by elution with water. The use of the first fraction from the column as an eluting solvent serves to minimize the amount of water employed as an eluting solvent.

5 Claims, 2 Drawing Figures

SEPARATION OF SACCHARIDES BY EXCLUSION CHROMATOGRAPHY

BACKGROUND OF THE INVENTION

1. Field Of The Invention

This invention relates to a process for the separation of saccharides by molecular exclusion chromatography to reduce the amount of eluting solvent used in the separation.

2 Description Of the Prior Art

There is a large market for starch conversion products having bland taste, low sweetness and low hydroscopicity. Such products are useful as bases for the preparation of food items as well as bodying agents and additives having non-sweet, water-holding, non-hygroscopic characteristics. Such products can also be used as carriers for synthetic sweeteners, as flavor enhancing materials, as carriers for coloring agents, as a spray-drying adjunct for coffee extract and for tea extract, as a bulking, bodying or dispersing agent in synthetic creams or coffee whiteners, as moisture holding agents in breads, pastry, and meats and as bodying and smoothing agents in puddings, fruits and frozen ice deserts.

In general, the relative sweetness of a starch conversion product depends upon the dextrose equivalent value, D.E. of the product. The term "D.E." as used herein refers to the reducing sugars content of the dissolved solids in a starch conversion product, expressed as percent dextrose as measured by the Schoorl method described in detail in *Encyclopedia Of Industrial Chemical Analysis*, Volume 11, pp. 41–2. In many applications, it is desirable to utilize a starch conversion product which has a low D.E. as well as one which exhibits extreme clarity and will not develop haze upon standing.

Starch conversion products are generally produced by the hydrolysis of starch in accordance with methods now known to those skilled in the art. For example, starch may be hydrolyzed by the use of a strong acid whereby the acid serves to cleave the dextrose units forming the starch molecule. Acid hydrolysis is generally a random process, and produces a hydrolysate containing starch fragments of many varying lengths, ranging from dextrose up to high molecular weight fragments formed by only slight hydrolysis of the starch. The starch fragments produced by hydrolysis are generally identified in terms of their degree of polymerization, DP. The term $DP_1$ refers to a starch hydrolysis fragment having a degree of polymerization of 1, that is dextrose, whereas a DP of 2 refers to a starch fragment having a degree of polymerization of 2, containing 2 dextrose units (maltose) and a DP of 3 refers to a fragment containing 3 dextrose units (maltotriose).

Starch can also be hydrolyzed through the use of a number of enzymes which likewise cleave the starch molecule at the oxygen linkage between the repeating dextrose units. Enzymatic hydrolysis, too, results in the formation of a somewhat more specific and narrower distribution of molecular weight fragments as compared to acid hydrolysis.

Various improvements in the acid and/or enzymatic hydrolysis of starch have been made in the art. For example, it has been found that the specificity of the starch hydrolysis reaction can be more accurately controlled through the use of a two-step enzymatic hydrolysis as described in U.S. Pat. No. 3,853,706. In the process described in that patent, it is shown that the amount of $DP_1$, $DP_2$ and $DP_3$ formed in an enzymatic hydrolysis is more limited when a two-step enzymatic process is employed. Another process to provide more specific control in the degrees of polymerization is described in U.S. Pat. No. 3,560,343 in which a two-step hydrolysis is carried out on starch, with the first step using an acid and the second step being carried out with an enzyme.

No matter how the starch hydrolysates are produced, there is invariably formed a distribution of polysaccharides. It is frequently desirable to provide starch hydrolysates which are rich in certain polysaccharide fractions. For example, high maltose syrups, that is, syrups containing a higher proportion of $DP_2$ than would otherwise be produced by acid and/or enzymatic hydrolysis of starch, have found use in certain applications such as in the manufacture of hard candies and in coating of cereals.

Up to the present, no hydrolysis method has been discovered in which certain desired distribution of saccharides can be economically obtained. Thus, there is a need to provide a method for efficiently and inexpensively separating saccharides each from the other to alter the saccharide distribution of complex polysaccharide mixtures.

A somewhat similar problem exists with respect to levulose, i.e., fruit sugar. It is now common practice to produce levulose by first hydrolyzing corn starch to produce a high dextrose syrup. That syrup is then treated with a xylose isomerase enzyme to convert the dextrose to its ketose counterpart, levulose. Since the starting material for the isomerization is produced by hydrolysis of starch, both the starting material for the enzymatic isomerization as well as the isomerate produced, contains polysaccharides as impurities in the conversion product containing mostly dextrose and levulose. It is therefore desirable to provide a simple and inexpensive means for separating levulose from dextrose and polysaccharides to produce a high levulose-bearing syrup.

The prior art, as represented by U.S. Pat. Nos. 3,756,919, 3,785,864 and 3,806,363, has suggested the use of exclusion chromatography to separate polysaccharides each from the other and to separate dextrose from levulose. As is now well known to those skilled in the art, exclusion chromatography involves the use of a chromatography column of bed which is packed with a porous adsorbent. The feed or supply to the column, usually in the form of a solution, is passed through the column followed by an eluting solvent. Various fractions are removed from the bottom of the column or bed, with the higher molecular weight materials which are present in the feed coming out of the column first followed by lower molecular weight components. As is now well understood by those skilled in the art, such higher molecular weight components of the feed mixture do not diffuse as rapidly into the pores of the chromatography packing material, and thus pass through the column more quickly than lower molecular weight material which tend to diffuse into the pores of the column packing. The eluting solvent serves to wash the materials from the packing of the column, the rates of elution depending upon the molecular weight and chemical structure of the various components.

In the separation of polysaccharides and in the separation of levulose from dextrose and polysaccharides, it has been found preferably to employ water as the eluting solvent. It is readily available at nominal cost, and it does not result in contamination of either the column or the components to be separated therein. However, to assure separations as completely as possible, it is necessary to employ large quantities of water as the eluting solvent. As a result, each of the fractions removed from the column becomes diluted. Since starch hydrolysates as well as levulose are used in the form of either a concentrated syrup or dried solids, a large proportion of the water introduced to the column must be removed through evaporation to produce a product ready for use. The concentration of the dilute exclusion products has thus been one of the significant economic disadvantages in the use of exclusion chromatography to separate polysaccharides each from the other and the separation of levulose from dextrose and polysaccharides.

OBJECTS OF THE INVENTION

It is accordingly an object of the present invention to provide a process for the separation of saccharides by exclusion chromatography which ameliorates the foregoing disadvantages.

It is a more specific object of the invention to provide a process for the separation of saccharides by exclusion chromatography wherein the amount of eluting solvent employed during the chromatographic separation is minimized.

It is a further object of the present invention to provide a process for the separation of monosaccharides and polysaccharides each from the other to alter the saccharide distribution of a starch hydrolysate with minimum elution solvent.

It is a related object of the invention to provide a process for the separation of levulose from dextrose and polysaccharides in which the amount of water used as an eluting solvent is minimized.

SUMMARY OF THE INVENTION

The concepts of the present invention reside in a process for separating saccharides by exclusion chromatography wherein a feed composed of a mixture of saccharides to be subjected to separation is supplied to an exclusion chromatography zone or column. During the elution cycle of the column, at least a first fraction containing the molecules which diffuse the least into the pores of the column packing (predominatly the highest molecular weight fragments when separating starch hydrolysis products), a second fraction containing molecular weight components having intermediate diffusibility (and predominantly intermediate molecular weight) and a third fraction of molecular weight components having the highest diffusibility (and predominantly the lowest molecular weight) are eluted from the column. In the practice of this invention, that first fraction is recycled to the chromatography zone during the elution cycle to serve as eluting solvent. The recycle of that first fraction is effected prior to the addition of water as an elution solvent.

It has been found, in accordance with this invention, that the first fraction containing the least diffusible molecular weight components, which is recycled to the zone, serves to significantly decrease the amount of eluting solvent required. As a result, the process of this invention facilitates the separation of saccharide fractions from the chromatography zone with less elution solvent as compared with prior art processes.

It is an important concept of this invention that the fraction recycled to the column be a fraction containing the components from the feed to the zone which are the least diffusible, and that the fraction be recycled in advance of supplying water as an eluting solvent to the column. In this way, the highest molecular weight fraction recycled, containing the highest molecular weight components, passes rapidly through the column without appreciably disturbing or shifting the column equilibrium. Thus, the highest molecular weight fraction is recycled to the column and begins to pass therethrough prior to the time that the eluting solvent is added to elute the intermediate fraction from the column.

The concept of this invention can be used to alter the saccharide distribution of a starch hydrolysate to produce fractions which are rich in any one of the polysaccharides randing from $DP_1$ through $DP_4$. The present invention is likewise applicable to the separation of levulose from dextrose and polysaccharides to produce a levulose syrup with less elution water, than if the polysaccharide fraction had not been recycled.

DESCRIPTION OF THE PREFERRED EMBODIMENTS

Figure 1:
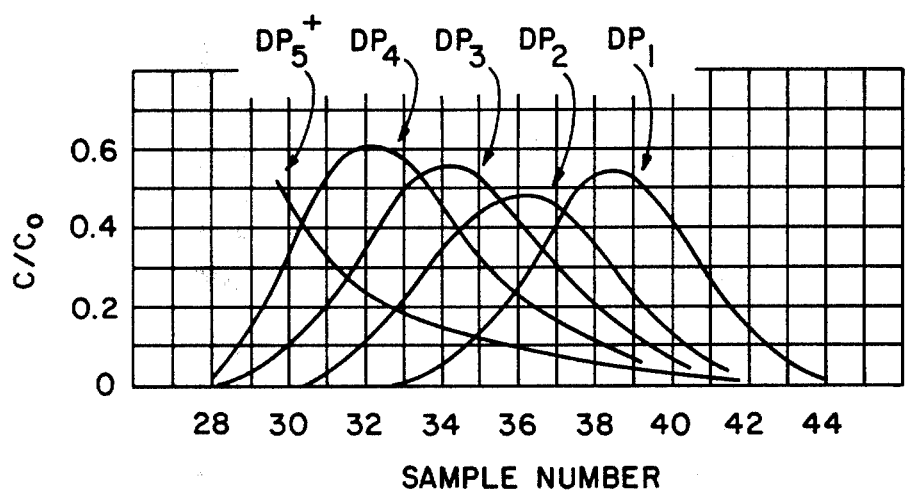
FIG. 1 is a graphical representation of the concentration of various fractions from a chromatography column relative to their initial concentration for a starch hydrolysate versus the number of fractions removed from the column.

The process of the present invention is ideally suited to the separation of starch hydrolysates containing a relatively broad distribution of polysaccharides. In carrying out the process of the invention, the exclusion chromatography column, described more fully hereinafter, is supplied with a feed mixture containing the polysaccharides to be separated. It is supplied to the chromatography column in the form of an aqueous solution, preferably having a solids content within the range of 10% to about 60%, d.s. The initial effluent from the column predominates in the $DP_{5+}$ polysaccharides, followed by $DP_4$, $DP_3$, $DP_2$ and $DP_1$ saccharides. The distribution of the various polysaccharides can best be illustrated by reference to FIG. 1 of the drawing, which is a plot of the ratio of the concentration of the DP component in the effluent to that in the supply for the various fractions taken off the column.

The high molecular weight, initial fraction can be varied, depending upon which polysaccharide is desired to be concentrated. As will be appreciated by those skilled in the art, if it is desired to separate a saccharide composition rich in maltose ($DP_2$), then the initial fraction containing the highest molecular weight component removed from the column is the fraction containing predominantly $DP_{5+}$ and $DP_4$ polysaccharides. That fraction is removed from the column and recycled. After the highest molecular weight fraction is eluted from the column, there follows an intermediate fraction rich in maltotriose ($DP_3$) which also includes the equilibrium amount of $DP_{5+}$ and $DP_4$ in the supply, and a third fraction rich in maltose and dextrose ($DP_2$ and $DP_1$, respectively), the lowest molecular weight components of supply.

If, on the other hand, it is desirable to produce a fraction rich in $DP_3$, then the fraction removed from the column initially containing the highest molecular weight components predominates in the $DP_{5+}$ polysaccharides. The fraction containing the intermediate molecular weight components, the $DP_4$ component as well as equilibrium amounts of $DP_{5+}$ components, is then removed from the column followed by the next subsequent fraction, rich in the $DP_3$ or maltotriose component. When operating the column to produce a fraction rich in maltotriose, the fraction rich in the $DP_{5+}$ polysaccharides is recycled after the feed is supplied to the column, and then the elution with water is begun to separate the intermediate fraction rich in the $DP_4$ component and the lower molecular weight fraction rich in the $DP_3$ component. If desired, a fourth fraction rich in $DP_2$ and $DP_1$ components can also be removed from the column. In that case, four different fractions are removed from the column the first fraction (rich in the $DP_{5+}$ polysaccharides) being the fraction recycled and the third fraction, rich in the $DP_3$ component, maltotriose, being the third fraction, containing the lower molecular weight polysaccharide.

The column is operated in a similar way when separating levulose from dextrose and polysaccharides. The levulose-bearing syrup, having a solids content ranging from 10% to about 60%, d.s., usually contains, in addition to dextrose and levulose, up to 10% or more of maltose and higher molecular weight polysaccharides. In carrying out the separation of levulose from dextrose using such a feed mixture, the highest molecular weight fraction, containing $DP_3$ and higher polyaccharides, is recycled to the column immediately after the feed is supplied thereto. Following recycling of that highest molecular weight fraction, the column is eluted with water as a solvent. The next fraction is an intermediate fraction rich in the next least diffusible saccharides present in the feed but containing equilibrium amounts of the higher polysaccharides from the recycle. The subsequent fractions from the column contain predominantly dextrose and levulose. In that separation, the bulk of the $DP_3$ and higher polysaccharides pass immediately through the column, and thus do not significantly contaminate the dextrose or levulose fractions.

Chromatography columns or beds used in the present invention can be any of a variety conventionally used in the prior art. Porous media suitable for use in the practice of this invention include ion exchange resins, granular forms of dextran, argarose and polyacrylamide gels, porous glass beads, activated carbon or alumina, controlled pore ceramics and the like.

Media frequently preferred for exclusion chromatography in accordance with the present invention are ion exchange resins, such as metal salts of sulfonated resins with a cross linked vinyl aromatic resin matrix. Such resins are typically polymers or copolymers of vinyl aromatic compounds (such as styrene, vinyl toluene, vinyl xylene, whose aromatic nuclei have been sulfonated and which have been cross linked to render the sulfonated polymers and copolymers insoluble in acids, bases or salts). The well-known DOWEX resins, marketed by the Dow Chemical Company, are typical of such resins.

In carrying out the separation, it has been found that best results are usually achieved where the chromatography is carried out at an elevated temperature to reduce the viscosity of the feed to the column, and thereby improve the flow rate of the feed to the column, particularly at high solids contents. For this purpose, it is possible to heat the feed before it is supplied to the column, and it is sometimes preferable to also provide the column or bed with suitable heat exchange media to maintain the column at the desired temperature. It is generally preferred that the temperature in the column range between about 60° F to about 200° F for most solids contents.

Starch hydrolysates and levulose-bearing syrups which are employed in the practice of this invention can be any of those produced in the prior art. For example, the process of this invention is particularly well suited to the separation of starch hydrolysates of the type described in U.S. Pat. Nos. 3,560,343 and 3,853,706, the disclosures of which are incorporated herein by reference.

The present invention, having been described in detail, the following specific examples are presented to illustrate additional embodiments of the process. It is to be understood that the examples are given for illustrative purposes only, and are not given by way of limitation.

EXAMPLE 1

This example illustrates the improved results which can be obtained in accordance with the practice of this invention by recycling a selected portion of the effluent from a chromatographic separation carried out on a mixture of polysaccharides obtained by hydrolysis of corn starch.

A feed sample of an acid hydrolysate of corn starch (CPC code 1435) was subjected to separation by exclusion chromatography. The feed had a D.E. of 40.2 and a saccharide distribution as follows:

|        | No. % d.b. |
|--------|------------|
| DP 1   | 10.7       |
| DP 2   | 39.2       |
| DP 3   | 16.7       |
| DP 4   | 7.4        |
| DP 5+  | 26.0       |

The column used in the separation was 4 inches in diameter and 16 feet long. It was loaded with a resin marketed by Rohm & Haas as XE-200. That resin was an ion exchange chromatography ion having a particle size of 30 to 50 mesh. It was in the calcium state.

The column was not insulated, but was traced with a 0.25 inch tubing carrying hot water maintained at 180° F to maintain the column effluent at a temperature ranging from 80° F to 84° F.

Operation Of Column Without Recycle

For comparative purposes, the above described column was supplied with a feed of 2500 ml. The feed had a dry solids content of 39.5%. After the feed was supplied to the column, 20,000 ml of water was added as the eluting solvent, and fractions were controlled so as to maintain a flow rate of approximately 65 ml/min.

After the column reached steady state, the ratio of the concentration of the DP component in each fraction to the concentration of that DP component in the supply (expressed as $C/C_0$) was calculated for each of the fractions from the column. They are graphically illustrated in FIG. 1 of the drawing. It will be observed that the fraction coming off the column initially contains $DP_{5+}$ components followed by the remaining components of the mixture in the order of decreasing molecular weights.

Separation Of The Column With Recycle According To The Invention

Using the same conditions as described above, the same column was loaded with the same feed and operated in accordance with the present invention with recycle of the initial effluent from the column. The feed rate was again 2500 ml, but the amount of water used as the eluting solvent was reduced from 20,000 to 16,000 ml, and the flow rate through the column was 65 ml/min.

The initial fraction from the column, composed of predominantly the $DP_{5+}$ and $DP_4$ polysaccharides, was first removed from the column and recycled. Thereafter, the elution water was added to the column.

Figure 2:
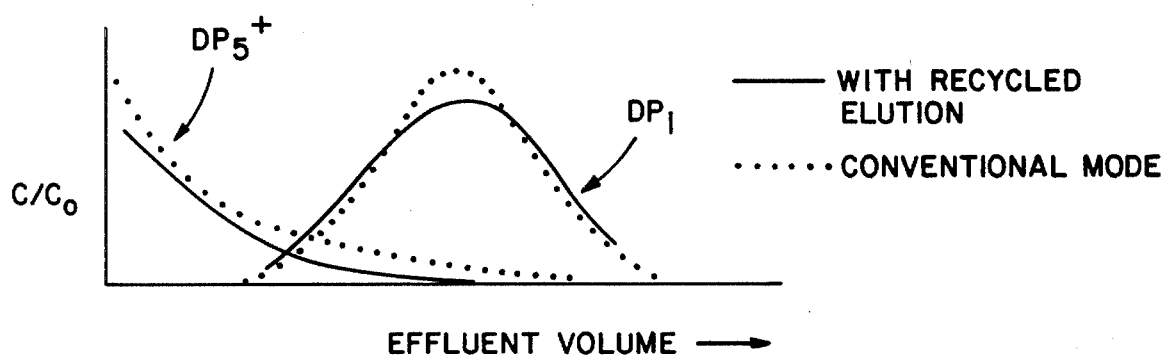
FIG. 2 is a graphical representation of the concentration, expressed as a ratio of initial concentration, of $DP_1$ and $DP_5$ fractions from a column versus an effluent volume for the prior art and for the process of this invention.

The various fractions from the column were subjected to analysis to compute the $C/C_O$ ratios, and the trace obtained was substantially the same as that obtained without recycle, shown in FIG. 1 of the drawing. FIG. 2 of the drawing illustrates the traces for the $DP_1$ and the $DP_{5+}$ components (with the recycle run being shown by way of a solid line and the non-recycle run being shown by way of a dotted line). It was concluded that 25% less elution water could be used when recycling the initial fraction from the column, without affecting the efficiency of the separation.

EXAMPLE 2

This example illustrates the application of the concepts of this invention to the separation of levulose from dextrose.

The column used in this example had a 4 inch diameter, and was 16 feet long. It was loaded with 1.2 cubic feet of the XE-200 cation resin described in Example 1. The column was again traced with tubing carrying water maintained at a temperature of 180° F.

The feed to the column was a syrup containing 42% levulose having a dry solids content of 39.5%. The syrup had the following composition:

|  | Parts By Weight |
| --- | --- |
| Dextrose | 50.1 |
| Levulose | 42 |
| Maltose | 4.3 |
| Isomaltose | 2.3 |
| Maltotriose | 0.1 |
| Panose | 0.6 |
| $DP_{4+}$ | 0.6 |
| Psicose | 0.14 |

The initial load of levulose-bearing syrup to the column was 2500 ml, and the flow rate through the column was maintained at 65 ml/min.

The initial fraction from the column contained predominantly $DP_{3+}$ polysaccharides, and they were recycled to the column. Thereafter, elution water (16,000 ml) was added to the column.

After the polysaccharide recycle, the next fractions were the polysaccharides to be discarded, followed by the dextrose-rich fraction, and subsequently by the levulose-rich fraction.

The levulose-rich fraction from the column was subjected to analysis and found to contain approximately 69% levulose d.b. It had a polysaccharide content of approximately 1.4% d.b.

The above procedure was repeated, except that no recycle of the initial fraction from the column was made and the amount of elution water was increased to 20,000 ml. The levulose-rich fraction had approximately the same composition as was obtained when the column was operated with recycle.

While the invention has been described in connection with specific embodiments thereof, it will be understood that it is capable of further modification, and this application is intended to cover any variations, uses or adaptions of the invention following, in general, the principles of the invention and including such departures from the present invention disclosure as come within the known or customary practice in the art to which the invention pertains and as may be applied to the essential features hereinbefore set forth, and as falls within the scope of the invention.

I claim:
1. A process for separating saccaharides by exculsion chromatography comprising the steps of
   a. supplying a feed mixture of saccharides to a molecular exclusion chromatography zone,
   b. collecting from the zone a first fraction containing the least diffusible saccharides of the mixture, said first fraction containing predominantly the highest molecular weight saccharides,
   c. collecting subsequent fractions of saccharides from the zone, including a second fraction containing predominantly intermediate molecular weight saccharides and a third fraction containing predominantly lower molecular weight saccharides,
   d. continuously eluting said zone, with the elution being carried out first with said first fraction and then with water, and
   e. recovering the fractions from the zone.
2. A process as defined in claim 1 wherein the feed mixture is a starch conversion product containing monosaccharides, disaccharides, trisaccharides, tetrasacchraides, pentasaccharides and higher polysaccharides.
3. A process as defined in claim 1 wherein the feed mixture contains levulose, dextrose and disaccharides and higher saccharides.
4. A process for altering the saccharide distribution of polysaccharides by exclusion chromatography comprising the steps of:
   a. supplying a feed mixture of saccharides containing monosaccharides, disaccharides, trisaccharides, tetrasaccharides, pentasaccharides and higher polysaccharides to a molecular exclusion chromatography zone,
   b. collecting from the zone a first fraction containing the highest molecular weight, least diffusible saccharides of the mixture,
   c. collecting subsequent fractions of saccharides from the zone, including a second fraction containing predominantly intermediate molecular weight saccharides, and a third fraction containing predominantly lower molecular weight saccharides,
   d. continuously eluting said zone, with the elution being carried out first with said first fraction and then with water, and
   e. recoving the fractions having a saccharide distribution different from that of the feed mixture from the zone.
5. A process for separating levulose from dextrose and polysaccharides by exclusion chromatography comprising the steps of
   a. supplying a feed mixture containing levulose, dextrose and polysaccharides to a molecular exclusion chromatography zone,
   b. collecting from the zone a first fraction containing the highest molecular weight, least diffusible saccharides of the mixture,
   c. collecting subsequent fractions of saccharides from the zone, including a second fraction rich in dextrose and a third fraction rich in levulose,
   d. continuously eluting said zone, with the elution being carried out with said first fraction and then with water, and
   e. recovering the fractions from the zone.

* * * * *